(No Model.)

J. REESMAN.
CHURN.

No. 265,442. Patented Oct. 3, 1882.

WITNESSES:
C. Neveux
C. Sedgwick

INVENTOR:
J. Reesman
BY Munn & Co.
ATTORNEYS.

UNITED STATES PATENT OFFICE.

JAMES REESMAN, OF AGENCY, IOWA.

CHURN.

SPECIFICATION forming part of Letters Patent No. 265,442, dated October 3, 1882.

Application filed February 14, 1882. (No model.)

*To all whom it may concern:*

Be it known that I, JAMES REESMAN, of Agency city, in the county of Wapello and State of Iowa, have invented an Improved Churn, of which the following is a full, clear, and exact description.

My invention is based on the discovery that cream may be rapidly converted into butter by causing it to be forced through and discharged from suitable pipes or passages arranged in the churn.

In carrying my invention into effect, I employ a double-acting force-pump, which forces the cream from the main body of the churn through the piston-wells of the pump, thence through suitable passages and pipes which discharge the cream back into the body of the churn, the circulation of the cream being thus made continuous and caused to pass through the pipes or passages over and over again.

Reference is to be had to the accompanying drawings, forming part of this specification, in which similar letters of reference indicate corresponding parts in both the figures.

Figure 1:
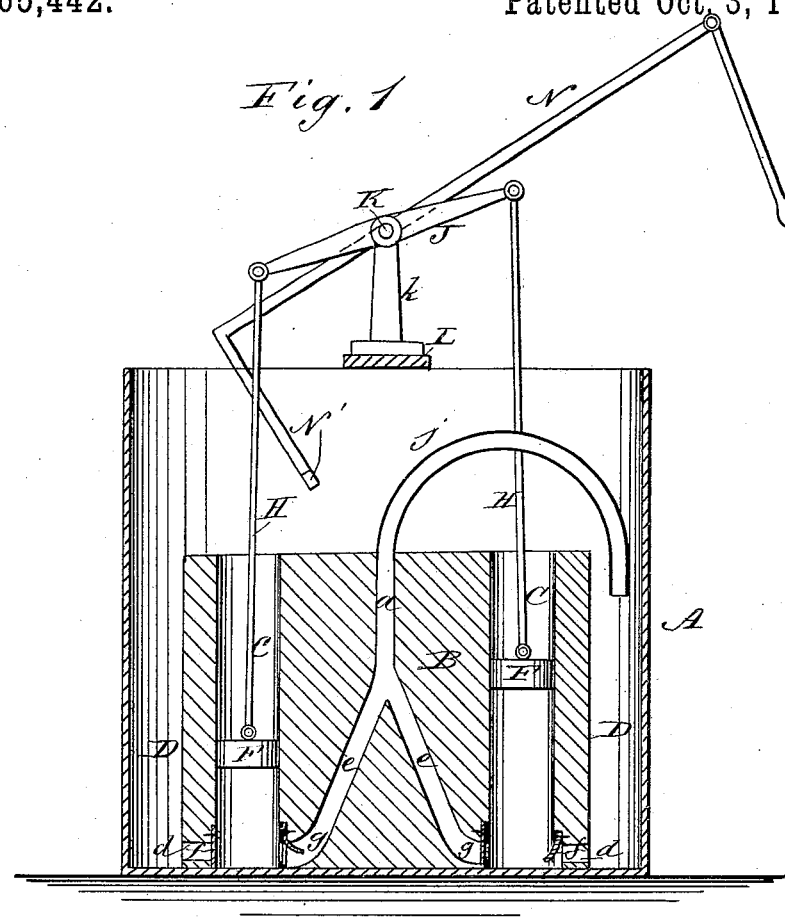
Figure 2:
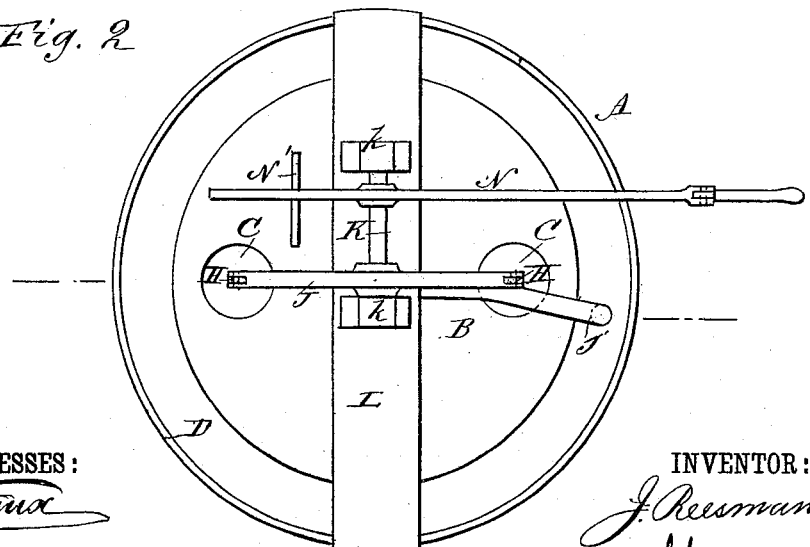

Figure 1 is a central sectional elevation of my improved churn, and Fig. 2 is a plan view thereof.

The main body A of the churn may be of any suitable form and size. Within the body A, I place the block of wood B, which is of less diameter than the churn-body, and is bored to form the piston-wells C C, and the central passage, *a*, which passage communicates with the branch passages *e e*, which in turn communicate with the wells C C, as clearly shown in Fig. 1. The piston-wells C communicate with the annular space D, between the block B and the walls of the churn-body, near the bottom of the block, by means of the openings *d d*, which are provided with the valves *f f*, which open within the piston-wells. The passages *e e* are provided with the valves *g g*, which open within the passages, as indicated in Fig. 1. Within the piston-wells are placed the piston-heads F F, which are connected by the connecting-rods H H to the walking-beam J, which is attached to the rock-shaft K, journaled in the uprights *k k*, secured upon the cross-board L, placed upon the upper edge of the churn-body. The shaft K is provided with the lever N for rocking the shaft and operating the piston-heads F F. In the passage *a* is placed the curved pipe *j*, which reaches from the said passage over the block and into the annular space D, as shown in Fig. 1. The forward end of the lever N is provided or formed with the beater N', which reaches into the churn, and serves to assist the circulation of the body of cream in the churn and to gather the butter.

In operation, the rock-shaft K being rocked by the lever N the piston-heads F F will alternately be raised and lowered in the piston-wells C, causing the cream to enter from the space D through the passages *d d* into the piston-wells C C upon the upward stroke of the piston-heads, and to be forced upon the downstroke of the pistons up through the passages *e e* and *a*, through the pipe *j*, back into the space D. The butter rises to and floats on top of the cream as fast as it is formed, being of less specific gravity than the cream or buttermilk. Hence it has no tendency to enter and obstruct the pipes and piston-wells. The pieces of butter that are floating on the cream are readily gathered soon after reaching the surface by the to-and-fro movement of the beater N', while the globules which contain the butter are broken by the force and rapid motion with which they are propelled through the cream.

By this construction and operation of the churn the cream is rapidly circulated around in the body of the churn and through the piston-wells and passages, and this circulation, together with the compression of the cream by the pistons, and its escape from the end of the pipe *j*, causes violent agitation of the cream and its rapid conversion into butter. Besides, the churn is very easy of operation.

It will be understood that I do not confine myself to this or any other particular construction of the churn for carrying out my improved method of churning, as the compression and rapid circulation of the cream through pipes or passages may be accomplished by various means.

Having thus fully described my invention, I claim as new, and desire to secure by Letters Patent—

1. The combination, with the body A, of the block B, having wells C connecting with space D, the central passage, a, the branch-valved passages e, and the valved openings d, the heads F, the rods H, the beam J, and the rock-shaft K, as and for the purpose specified.

2. The combination, with the churn and rocking-shaft, of the lever N, having beater N', reaching into the churn, whereby said lever will rock said shaft, promote the circulation of the cream, and gather the butter, as shown and described.

JAMES REESMAN.

Witnesses:
C. N. SMITH,
J. S. SMITH.